Nov. 1, 1960  R. V. BLOOMFIELD ET AL  2,958,486
AIRCRAFT FLOTATION AND WATER PLANING DEVICE
Filed Jan. 5, 1956  2 Sheets-Sheet 1

Robert V. Bloomfield
Albert Sechrist
INVENTORS.

BY Clarence A. O'Brien
and Harvey B. Jacobson
Attorneys

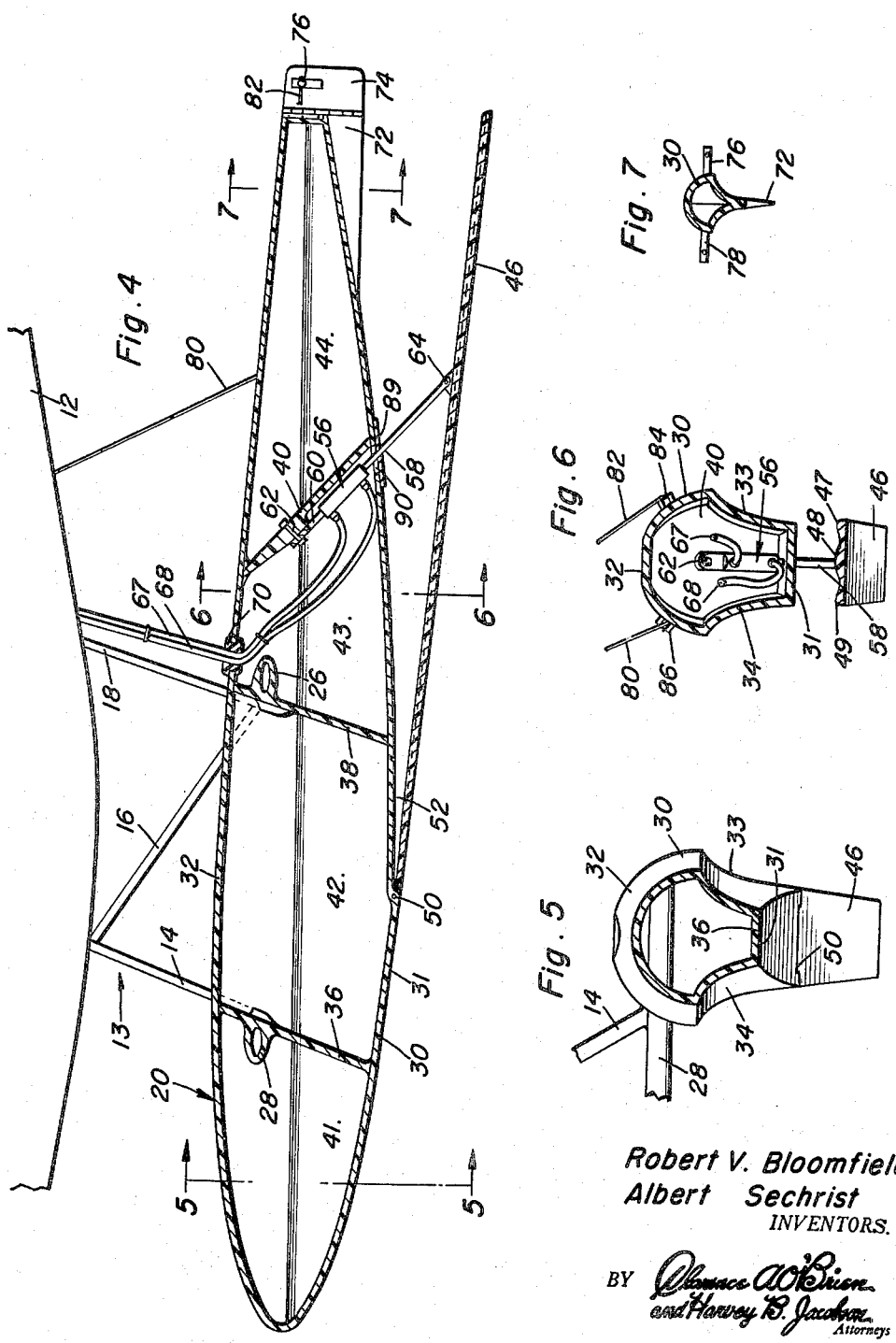

United States Patent Office 2,958,486
Patented Nov. 1, 1960

2,958,486

AIRCRAFT FLOTATION AND WATER PLANING DEVICE

Robert V. Bloomfield, Box 77, Boeing Field, Seattle 8, Wash., and Albert Sechrist, 11626 132nd St., Suite 6, Edmonton, Alberta, Canada Filed Jan. 5, 1956, Ser. No. 557,600

3 Claims. (Cl. 244—105)

This invention relates to attachments for aircraft, and particularly to a novel flotation and water planing assembly primarily, but not exclusively useful with light aircraft.

An object of this invention is to provide an aircraft flotation device which is made of light, strong material and has a number of liquid-tight compartments in it, the compartments being formed by bulkheads which serve as structural supporting members lending strength and rigidity to the flotation device.

Another object of this invention is to provide a flotation device for an aircraft that is attached to the aircraft undercarriage, said flotation device having a hydroski hingedly secured at its forward end to the bottom surface of the flotation device at a station intermediate the front and rear ends thereof.

A further object of this invention is to provide improved means for guiding the aircraft, that is, by having a control surface member at the trailing end of the flotation device, this member being operable from the interior of the aircraft by means of control cables or linkages or both.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a longitudinal sectional view taken substantially on the line 4—4 of Figure 1 and in the direction of the arrows;

Figure 5 is a transverse sectional view taken substantially on the line 5—5 of Figure 4 and in the direction of the arrows;

Figure 6 is a transverse sectional view taken along the plane of line 6—6 of Figure 4 and in the direction of the arrows; and Figure 7 is a transverse sectional view taken substantially on the plane of line 7—7 of Figure 4 and in the direction of the arrows.

Figure 1:
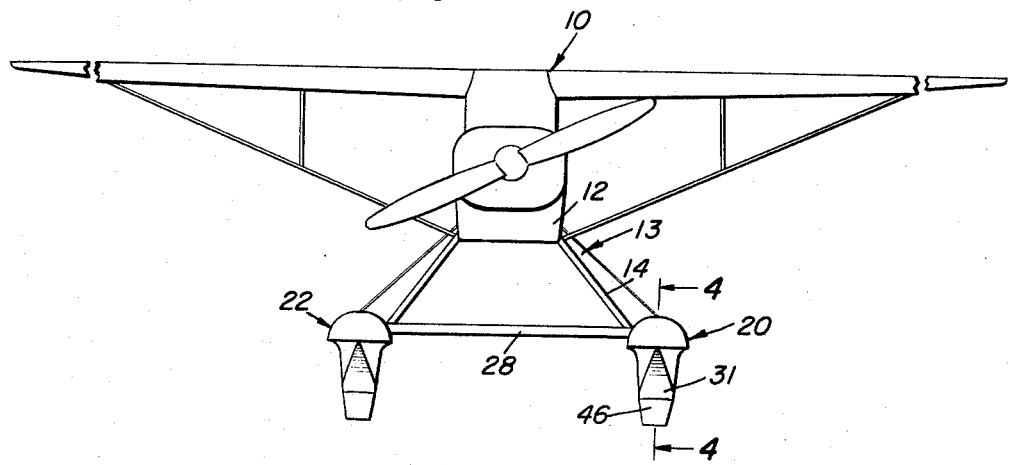
Figure 1 is a front view of a standard light aircraft to which the invention has been applied.
Figure 2:
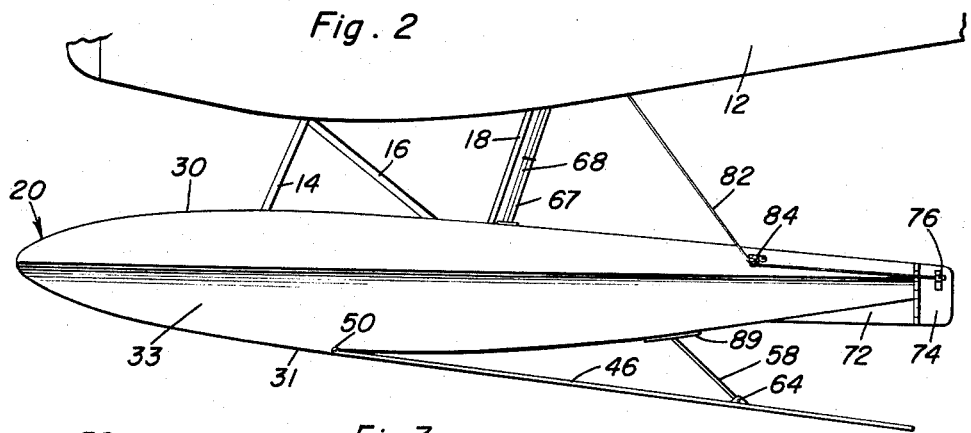
Figure 2 is an elevational side view of the combined flotation and water planing device which is adapted to be secured to the undercarriage of an aircraft.
Figure 3:
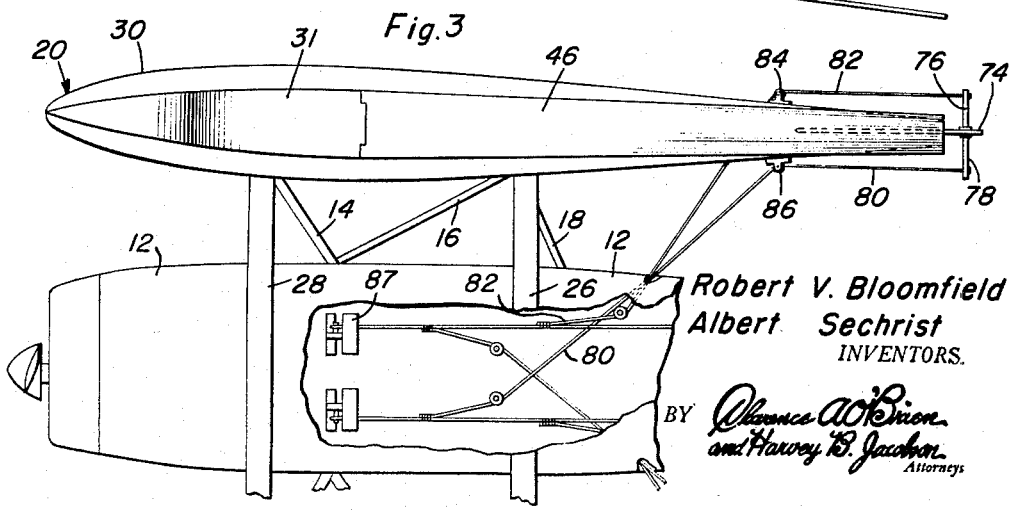
Figure 3 is a bottom view of the device in Figure 2.

The aircraft 10 is recognizable as a "Piper Cub" and the purpose of the illustration is not only to show the environment of the invention, but the fact that a light aircraft is provided with the invention. Of course, heavier aircraft may be used in practicing the invention, but the relative sizes of the flotation devices and the hydroskis must be altered in order to handle the heavier loads which will be involved in both landing and take-off as well as in planing.

The aircraft 10 is provided with a fuselage 12 as well as other structural parts. The undercarriage 13 of the aircraft consists of suitable supports for the flotation devices. For example, struts 14, 16 and 18 depend from the fuselage 12 and are used in support of the flotation and planing device 20. The device 20 is similar to the flotation and planing device 22 which is suspended from and secured to the undercarriage 13, and therefore, only one has been shown in detail. Spreader bars 26 and 28 extend across the devices 20 and 22 in order to hold them together as a structurally sound unit.

The aircraft flotation and water planing device 20 consists of a hollow body 30 which has a bottom 31, a curved top wall 32, curved side walls 33 and 34, each shaped and arranged for high hydrodynamic efficiency. Comparison of Figures 5–7 yields an understanding of one suggested configuration.

There are three inclined bulkheads 36, 38 and 40, respectively, in the body 30, these bulkheads being spaced from each other and serving to form water-tight compartments 41, 42, 43 and 44 in the body 30. The strut 14 passes through an aperture in the top 32 and is secured to the bulkhead 36. This bulkhead also supports the spreader bar 28 which passes through an opening in the body 30 and which is rigidly secured to the bulkhead. Bulkhead 38 has struts 16 and 18 secured to it as well as spreader bar 26. The final bulkhead 40 functions as a support for the means to extend and retract hydroski 46.

This hydroski has longitudinal ribs 47, 48 and 49 rising from the top surface thereof for rigidity and strength, while the forward end of the hydroski has a hinge 50 connecting it to the bottom 31 of body 30. Hinge 50 may be of the articulated type or may be a piano hinge or other kind, so long as it possesses the required strength. The bottom 31 of the body 30 may be recessed slightly, as at 52, in order to accommodate the hydroski 46 when in the retracted position in order to minimize drag.

The means 56 for withdrawing and extending the hydroski 46 from the body 30 is preferably a fluid motor, that is, either an air or hydraulic cylinder having a piston with a piston rod 58 extending therefrom. The cylinder has a mounting bracket 60 secured to it which is connected to the bulkhead 40 by means of a pivot 62 allowing it to move pivotally the necessary distance for operation of hydroski 46. The outer end of piston rod 58 is connected by pivotal connection 64 to the upper surface of the hydroski 46. Therefore, when the piston is actuated in its cylinder, the rod 58 will cause the hydroski 46 to move toward or away from its recess 52 depending on the direction of movement caused by the fluid applied in the fluid motor 56. Fluid supply conduits 67 and 68 extend through an aperture in which there may be a grommet 70, in the top wall 32 of the body 30 and are connected with the fluid motor 56. These conduits extend from a suitable source of fluid under pressure carried by the airplane 10 and controlled by standard valves in the cockpit. It is noted that these conduits may extend through one of the struts 18, 16 or 14, preferably the former, so that they will not have to pass through any of the other bulkheads, and the only requirement is that the struts be made large enough to accommodate the fluid lines.

A vertical fin 72 is secured to the bottom 31 near the trailing end thereof and is located in advance of the control surface member 74. This latter member is a rudder aiding in the lateral control of the aircraft. It has horns 76 and 78 extending therefrom to which the control cables 80 and 82 are attached. These cables, after passing over suitable guides 84 and 86 enter the fuselage 12 and are connected with the aircraft rudder control mechanism 87 for simultaneous operation therewith.

It is intended that the flotation and water planing devices be made of plastic material. There are commercially available a number of synthetic resinous materials which are suitable, such being selected from the epoxide or the acrylic group, the latter group containing such widely known plastics as "Lucite" and "Plexiglas." However, other materials of construction may be used where found desirable or more expedient.

In use of the invention, the hydroski 46 may be extended by actuation of the fluid motor 46 which urges the piston rod 58 outwardly through the water seal 89 which covers the opening 90 in the bottom of the hull but allows the rod to be actuated. Landings, take-off and planing are accomplished in the usual way, that is, by proper aircraft control manipulation.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an aircraft fuselage together with an undercarriage, a combined flotation and water planing device comprising a watertight body, said body being buoyant, means attaching said body to said undercarriage, a hydroski extending more than half the length of said body and pivoted at its forward end to the lower part of said body, said hydroski having planiform dimensions sufficiently small so that it fits wholly beneath said body, means carried by said body and attached to said hydroski for pivotally actuating the latter, said body having a recess in the lower surface thereof to accommodate said hydroski when in the withdrawn position with respect to said body, a bulkhead in said body and separating said body into compartments, and means for actuating said hydroski consisting of a fluid motor located in one of said compartments and attached to said bulkhead and said hydroski.

2. The combination of claim 1 wherein the aircraft has a rudder control mechanism, a control surface member at the trailing end of said body, and means connected with said control surface member for actuating said member in unison with the rudder control mechanism of the aircraft.

3. The combined flotation and water planing device of claim 1 wherein said body is constructed of plastic material, said bulkhead arranged at an angle to the longitudinal axis of said body and having said fluid motor attached thereto at a similar angle, the lower part of said body having an opening through which a portion of said motor extends, and a seal having an opening through which said part of said motor extends and fitted over said opening in said body.

References Cited in the file of this patent

UNITED STATES PATENTS

| 1,142,754 | Curtiss | June 8, 1915 |
| 1,197,746 | Kleckler | Sept. 12, 1916 |
| 1,200,259 | Steinmetz | Oct. 3, 1916 |
| 1,265,035 | Bazaine | May 7, 1918 |
| 1,500,444 | Dornier | July 8, 1924 |
| 1,794,474 | Von Miller | Mar. 3, 1931 |
| 1,880,520 | Stout | Oct. 4, 1932 |
| 2,347,841 | Parker | May 2, 1944 |
| 2,369,129 | Bell et al. | Feb. 13, 1945 |
| 2,753,135 | Gouge | July 3, 1956 |

FOREIGN PATENTS

| 460,141 | France | Sept. 26, 1913 |
| 474,908 | Great Britain | Nov. 9, 1937 |
| 974,203 | France | Feb. 20, 1951 |